(12) United States Patent
Buel

(10) Patent No.: US 11,618,629 B2
(45) Date of Patent: Apr. 4, 2023

(54) TRACK AND TROLLEY TRANSPORT AND STORAGE SYSTEM

(71) Applicant: Tabb Buel, Stilwell, KS (US)

(72) Inventor: Tabb Buel, Stilwell, KS (US)

( * ) Notice: Subject to any disclaimer, the term of this patent is extended or adjusted under 35 U.S.C. 154(b) by 39 days.

(21) Appl. No.: 17/164,028

(22) Filed: Feb. 1, 2021

(65) Prior Publication Data

US 2022/0063908 A1   Mar. 3, 2022

Related U.S. Application Data

(60) Provisional application No. 63/073,087, filed on Sep. 1, 2020.

(51) Int. Cl.
| | | |
|---|---|---|
| *B66F 9/07* | (2006.01) | |
| *B65G 1/04* | (2006.01) | |
| *B65G 17/20* | (2006.01) | |

(52) U.S. Cl.
CPC ........... *B65G 1/0407* (2013.01); *B65G 17/20* (2013.01); *B66F 9/07* (2013.01)

(58) Field of Classification Search
CPC ........... B65G 1/0407; B66C 1/22; B66C 1/12; B66C 9/02; B66C 11/16; B66B 9/00; B66D 3/04; B66D 3/18
See application file for complete search history.

(56) References Cited

U.S. PATENT DOCUMENTS

| | | | |
|---|---|---|---|
| 3,883,002 A | 5/1975 | Moore | |
| 3,907,113 A * | 9/1975 | Kropelnitski | B62H 3/12 414/227 |
| 3,976,200 A | 8/1976 | Munns | |
| 4,136,782 A | 1/1979 | Hugel | |
| 4,700,845 A | 10/1987 | Fretter | |
| 4,749,089 A | 6/1988 | Stewart, III | |
| 5,183,162 A * | 2/1993 | Ritzenthaler | B62H 3/12 211/121 |
| 5,474,189 A | 12/1995 | Peterson | |
| 6,336,564 B1 * | 1/2002 | Garnier | A47F 7/286 211/94.02 |
| 6,729,478 B1 * | 5/2004 | Boers | B62H 3/12 211/18 |
| 7,428,950 B2 * | 9/2008 | del Rio | B66B 11/008 187/277 |

(Continued)

*Primary Examiner* — Kaitlin S Joerger
(74) *Attorney, Agent, or Firm* — Hovey Williams LLP

(57) ABSTRACT

Described herein is a storage system for installation onto a surface, such as a horizontal or vertical wall, such as an interior garage ceiling, floor, or wall. The system can be used to move, lift, and/or store articles, such as bicycles, skis, storage containers, and the like. The system generally comprises a track defining a longitudinally extending path and a trolley assembly coupled to the track. The trolley assembly generally comprises a trolley body, a pair of opposing sidewalls extending from the trolley body, and a roller assembly positioned between the pair of opposing sidewalls. The trolley assembly may further comprise a carrier attachment to secure an article thereto. A drive member and drive unit can be used for effecting movement so as to shift the trolley assembly from one position to another. The system generally comprises simple and easy-to-install components, thereby providing advantages over prior storage systems.

19 Claims, 15 Drawing Sheets

(56) References Cited

U.S. PATENT DOCUMENTS

| | | | |
|---|---|---|---|
| 8,191,487 B2* | 6/2012 | Theesfeld | F16M 11/24 |
| | | | 108/50.01 |
| 8,468,745 B2 | 6/2013 | Krause | |
| 9,004,295 B2* | 4/2015 | Dovner | B62H 3/12 |
| | | | 211/17 |
| 10,934,134 B2* | 3/2021 | Willard | B66D 1/12 |
| 11,407,623 B2* | 8/2022 | Boggess | B66F 7/28 |
| 2006/0226106 A1* | 10/2006 | Zaguroli | B66C 9/14 |
| | | | 212/331 |
| 2007/0034760 A1 | 2/2007 | Moore | |
| 2019/0241414 A1* | 8/2019 | Willard | B66D 1/12 |
| 2019/0254425 A1* | 8/2019 | Xiang | A47F 5/103 |
| 2021/0298976 A1* | 9/2021 | Walke | B66C 11/06 |
| 2021/0316968 A1* | 10/2021 | Lo | B66C 7/08 |

* cited by examiner

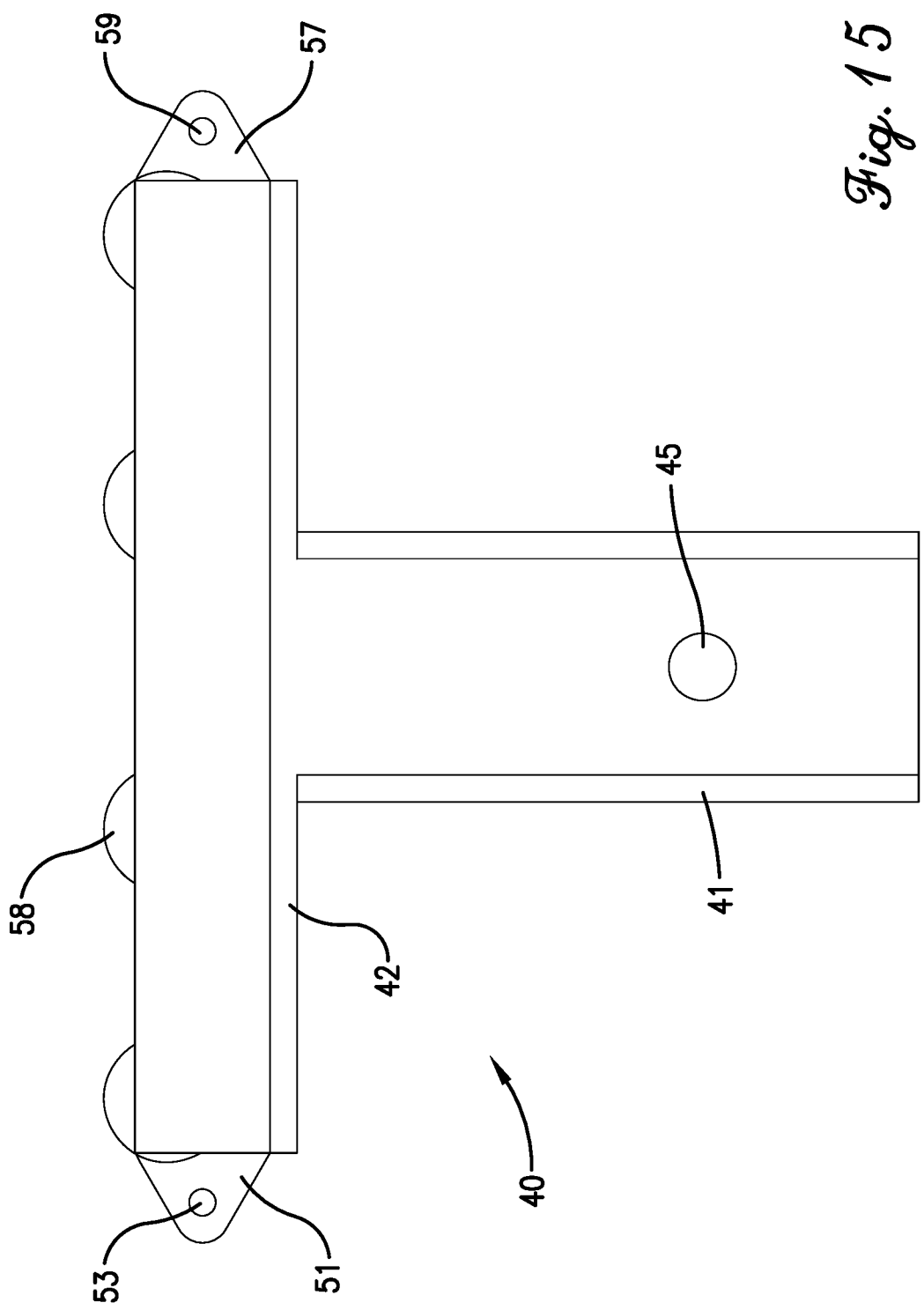

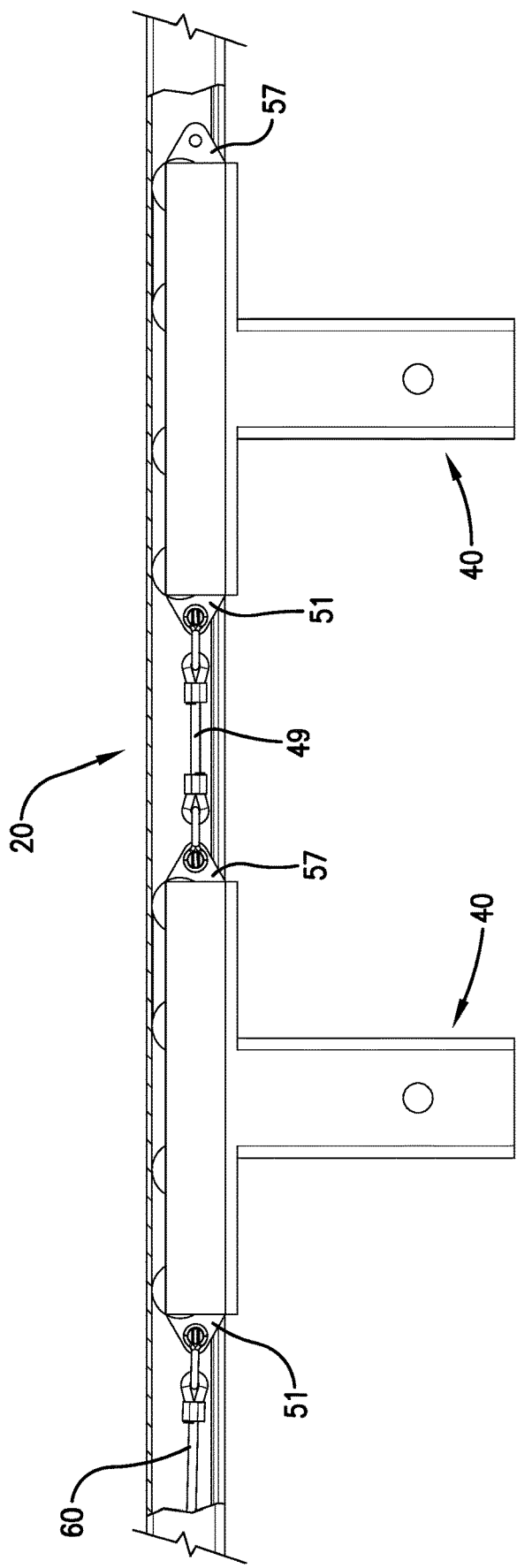

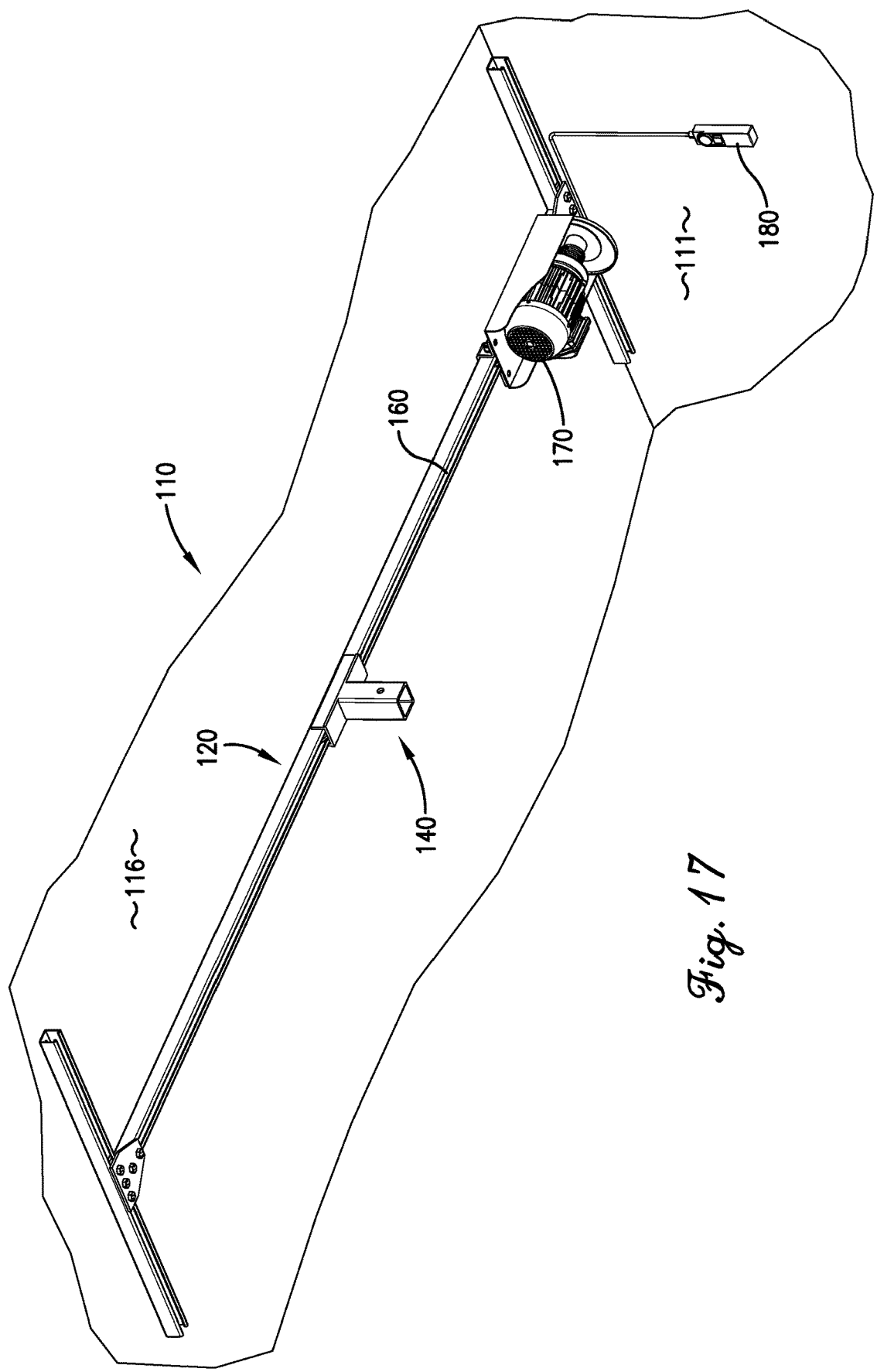

TRACK AND TROLLEY TRANSPORT AND STORAGE SYSTEM

CROSS-REFERENCE TO RELATED APPLICATIONS

The present application claims the priority benefit of U.S. Provisional Patent Application Ser. No. 63/073,087, filed Sep. 1, 2020, entitled LIFT AND STORAGE SYSTEM, incorporated by reference in its entirety herein.

BACKGROUND OF THE INVENTION

Field of the Invention

Embodiments of the present invention broadly concern a system for storing articles through mounting of a carrier which may conveniently be coupled to a common automobile towing receiver. More particularly, it is concerned with a system which employs a drive member and trolley assembly to move and/or lift the carrier, and thus the article, to maximize available living space, re-use of the carrier, and/or make mounting of the articles on the carrier much easier.

Description of the Prior Art

Among the problems confronting a homeowner or apartment dweller is the difficulty in storing and transporting large bulky items. Closets and shelving systems are commonly employed for smaller items, but larger articles such as bicycles, kayaks, push mowers, cargo carriers, coolers, camping gear, kids toys, skis, and the like present a special problem. Skis and kayaks are long, and bicycles often require large amounts of floor space for storage and are time consuming and difficult to continuously move or disassemble. Transportation of such large objects by vehicle includes carriers which are inserted into a receiver of an automobile and allow bicycles, skis, coolers, camping gear, and the like to be carried on the exterior of the vehicle. However, in order to inhibit theft and corrosion due to rain or snow, while keeping ready access to the articles for use, these items are best stored in a basement, garage, interior of the home, or offsite storage rental.

Aside from simply resting such large items on the floor, one approach has been to mount large articles on a wall or to lift them to an elevated position by the use of hooks or cables. In the case of a bicycle, these mounts may be as simple as two spaced hooks extending from a wall or ceiling to support the bicycle by its frame, typically a horizontal tube. Also, other objects may be hung from a ceiling or on walls by hooks or cables and may nonetheless occupy or add clutter to the useful space of the garage, basement or other enclosure. The bicycle or other heavy objects that are manually lifted to the storage position may be beyond the physical capacity of many users. Various refinements of bicycle wall mounts are disclosed in U.S. Pat. No. 3,883,002 to Moore, U.S. Pat. No. 3,976,200 to Munns, U.S. Pat. No. 4,136,782 to Hugel, U.S. Pat. No. 4,700,845 to Fretter, and U.S. Pat. No. 4,749,089 to Stewart III. Such devices provide only limited improvements in terms of usability and space savings, concentrating primarily on preventing a bicycle from falling or being tipped over and typically only hold a single bike. Thus, in order to store multiple bikes, one must utilize multiple hooks on the wall. They do little to prevent the bicycle from being damaged by other objects or remove them from high traffic areas. In addition, they may present an obstacle themselves when the user must avoid them in everyday use even with the bicycle or other article removed. They also do little to create more space for parking vehicles in the garage which defeats one of the main objectives to create more space.

Alternative types of lift devices have been explored to assist the consumer increase the useful space in the home or other confined storage spaces such as garages. One approach has been to mount the bicycle on a wall mount and lift it manually to an overhead position to remove it from the floor and above the area of immediate use. U.S. Pat. No. 5,474,189 to Peterson discloses a complex lift and storage apparatus using a rack that can be used to lift the bicycle from an upright position resting on the floor to a raised horizontal position adjacent the ceiling. Such a system, however, requires strength to lift the bicycles, may be cumbersome, and is complex to manufacture and assemble on site.

Other devices have included automated lifts, which use powered garage door openers, such as those disclosed in U.S. Pat. No. 5,183,162 to Ritzenthaler and U.S. Pat. No. 8,468,745 to Krause. However, such systems require the use of an overhead motor and track, such as a motorized garage door system, and are difficult to install and take skill to mount securely and safely to the ceiling.

A more recent advancement is disclosed in U.S. Patent Application Publication No. 2019/0241414 to Willard and includes a motor system operable to raise and lower a trolley along a track mounted to a wall. However, the track is large, bulky, and comprises widely spaced track segments, which complicates installation and may create instability in the carrier. Additionally, the trolley wheels are relatively exposed, which can create a safety issue and allow the trolley to be easily dislodged from the track during use or if accidentally shaken, bumped, or the load shifts during operation or in the storage position.

As a result, there is a need for a simplified storage system, which is easy to install using simple and readily available materials yet is safe, secure, durable, and reliable during everyday use.

SUMMARY OF THE INVENTION

These and other needs are largely met by the track and trolley storage system of the present invention. That is to say, certain embodiments of the present invention are designed to minimize the usable floor, wall, and room space occupied for storing large items such as bicycles, kayaks, and mowers, and minimizes lifting of those articles for mounting. Certain same or other embodiments are also designed to simplify movement and storage of large items across a horizontal surface, such as a floor or ceiling. Moreover, the present invention advantageously can be easily transported, assembled, operated, and installed, for example by a single user with no or minimal prior experience or training with mechanical lifts or equipment.

Broadly speaking, the present invention includes a horizontal or upright track, a trolley assembly coupled to the track for translational shifting therealong, a drive member for shifting the trolley assembly along the track, and a drive unit for effecting movement of the drive member and shifting (e.g., raising and lowering, or horizontal movement) of the trolley assembly. The trolley assembly may optionally include commonly available carrier attachments, including, but not limited to, bike racks, ski racks, cargo carriers, barbeque grills, and/or other hitch mounted carriers. The track serves to guide the movement of the trolley assembly therealong and to permit attachment of the system to a surface, and particularly to an interior surface, such as an upright wall, floor, ceiling, or other supporting structure, which may be independent or associated with an upright wall, floor, or ceiling. Advantageously, the track enables the trolley assembly to move along practically its full length, thereby allowing, in certain embodiments, the trolley to be stopped adjacent the floor for ease of use while elevating to take the trolley and the carrier up and out of the way of occupants of the room. The track also enables the use of a variety of different drive members, including cables, chains, and the like. The trolley may be designed such that it encapsulates the track so as to not allow the lifted load (and carrier that may be attached to the hitch receiver) to fall during the lift or from the stored elevated position. The drive unit may comprise a motor and be actuated by a switch (e.g., up/down switch), optionally with a safety stop and lock, or alternatively by a remote transmitter or software application accessed through a phone or tablet device.

In one embodiment, there is provided a transport and storage system. The system comprises a track having a first end and a second end and defining a longitudinally extending path therebetween. The system further comprises a trolley assembly coupled to the track for translational shifting along the path. The trolley assembly comprises a trolley body, a pair of opposing sidewalls extending from the trolley body, and a roller assembly positioned between the pair of opposing sidewalls. The system further comprises a drive member coupled to the trolley assembly. The system further comprises a drive unit affixed to the first end of the track and operatively coupled to the drive member for translating the trolley assembly along the path.

In another embodiment, there is provided a surface having the transport storage system described above installed thereon.

In another embodiment, there is provided a method of storing an article. The method comprises providing the transport and storage system described above installed on a surface. The article is then secured to the trolley assembly, and the drive unit is operated so as to engage the drive member and translate the trolley assembly along the path toward the first end or the second end of the track.

In one embodiment, there is provided a lift and storage system for installation onto a vertical wall. The system comprises a track having a first end and a second end and defining a longitudinally extending path therebetween. The track comprises a base portion configured to be positioned adjacent an exterior surface of the vertical wall. The system further comprises a trolley assembly coupled to the track for translational shifting along the path. The trolley assembly comprises a trolley body, a pair of opposing sidewalls extending from the trolley body, and a roller assembly positioned between the pair of opposing sidewalls. The system further comprises a drive member coupled to the trolley assembly. The system further comprises a drive unit affixed to the first end of the track and operatively coupled to the drive member for translating the trolley assembly along the path.

In another embodiment, there is provided a vertical wall having the lift and storage system described above installed thereon.

In another embodiment, there is provided a method of lifting and storing an article. The method comprises providing the lift and storage system described above installed on a vertical wall and having the trolley assembly positioned adjacent the second end of the track. The article is then secured to the trolley assembly, and the drive unit is operated so as to engage the drive member and translate the trolley assembly along the path toward the first end of the track.

BRIEF DESCRIPTION OF THE DRAWINGS

FIG. 15 is a side view of a trolley assembly according to one embodiment of the present invention;

FIG. 16 is a side view of multiple trolley assemblies installed on the same track according to one embodiment of the present invention; and FIG. 17 is a perspective view of an overhead storage system according to one embodiment of the present invention.

DETAILED DESCRIPTION OF THE PREFERRED EMBODIMENT

Figure 1:
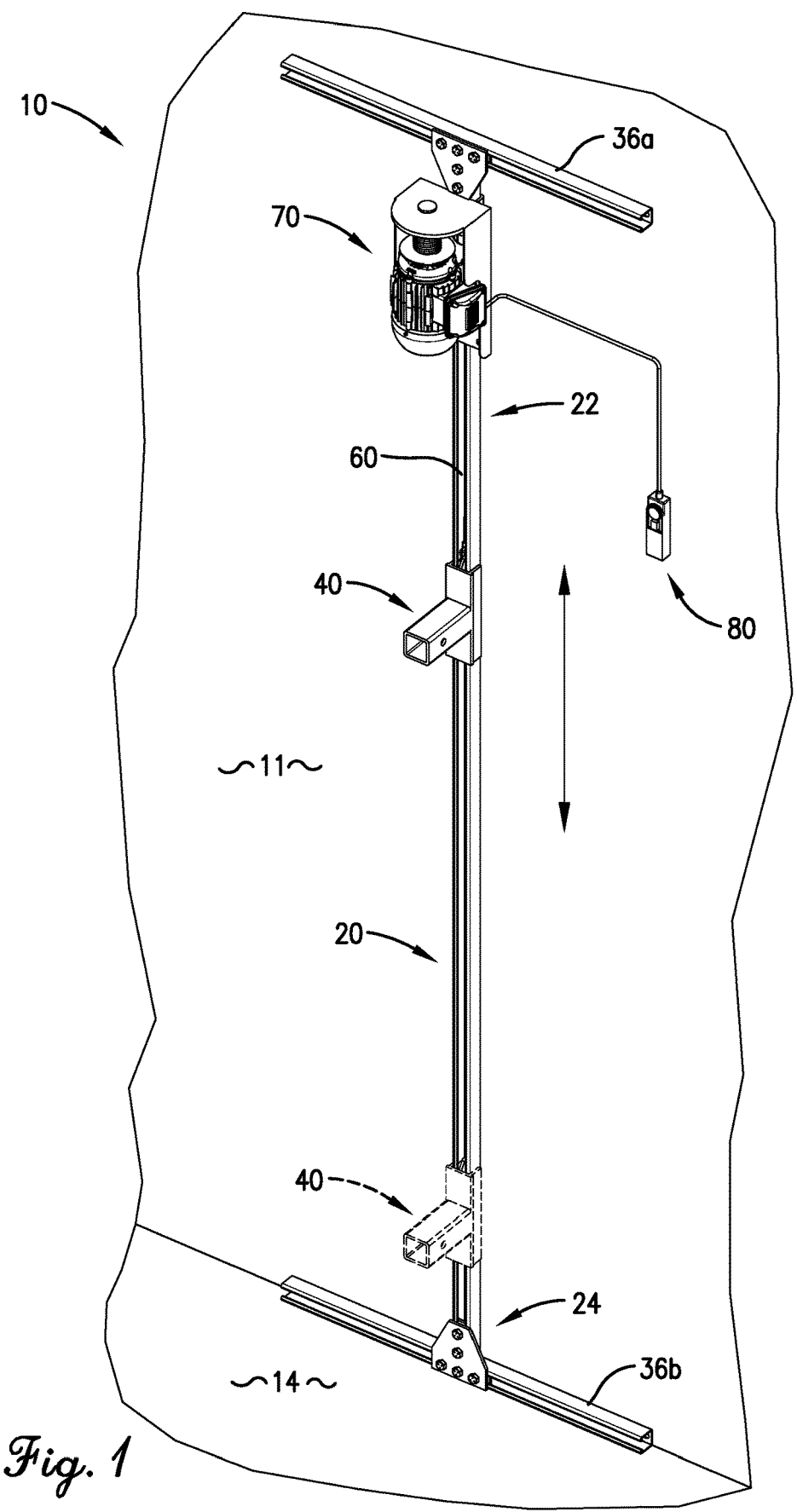
FIG. 1 is a perspective view of a lift and storage system according to one embodiment of the present invention.

Referring now to the drawing figures, as shown in FIG. 1, a storage system, and particularly a transport and storage system 10, is provided mounted to vertical wall 11 of a structure which permits articles to be lifted above the floor 14 to adjacent a ceiling. Although shown as installed on a vertical wall 11 in FIG. 1, it should be understood that the transport and storage system may also be installed on horizontal surfaces, such as ceilings and floors, in accordance with embodiments of the present invention. The system 10 broadly includes a track 20, a trolley assembly 40, a drive member 60 coupled to the trolley assembly 40, and a drive unit 70 coupled to the drive member 60. Trolley assembly 40 is generally coupled to track 20 for translational shifting therealong. In certain embodiments, system 10 further includes an actuator 80 for initiating operation of drive unit 70. In certain embodiments, trolley assembly 40 includes a carrier (not shown) removably coupled to trolley assembly 40.

Figure 2:
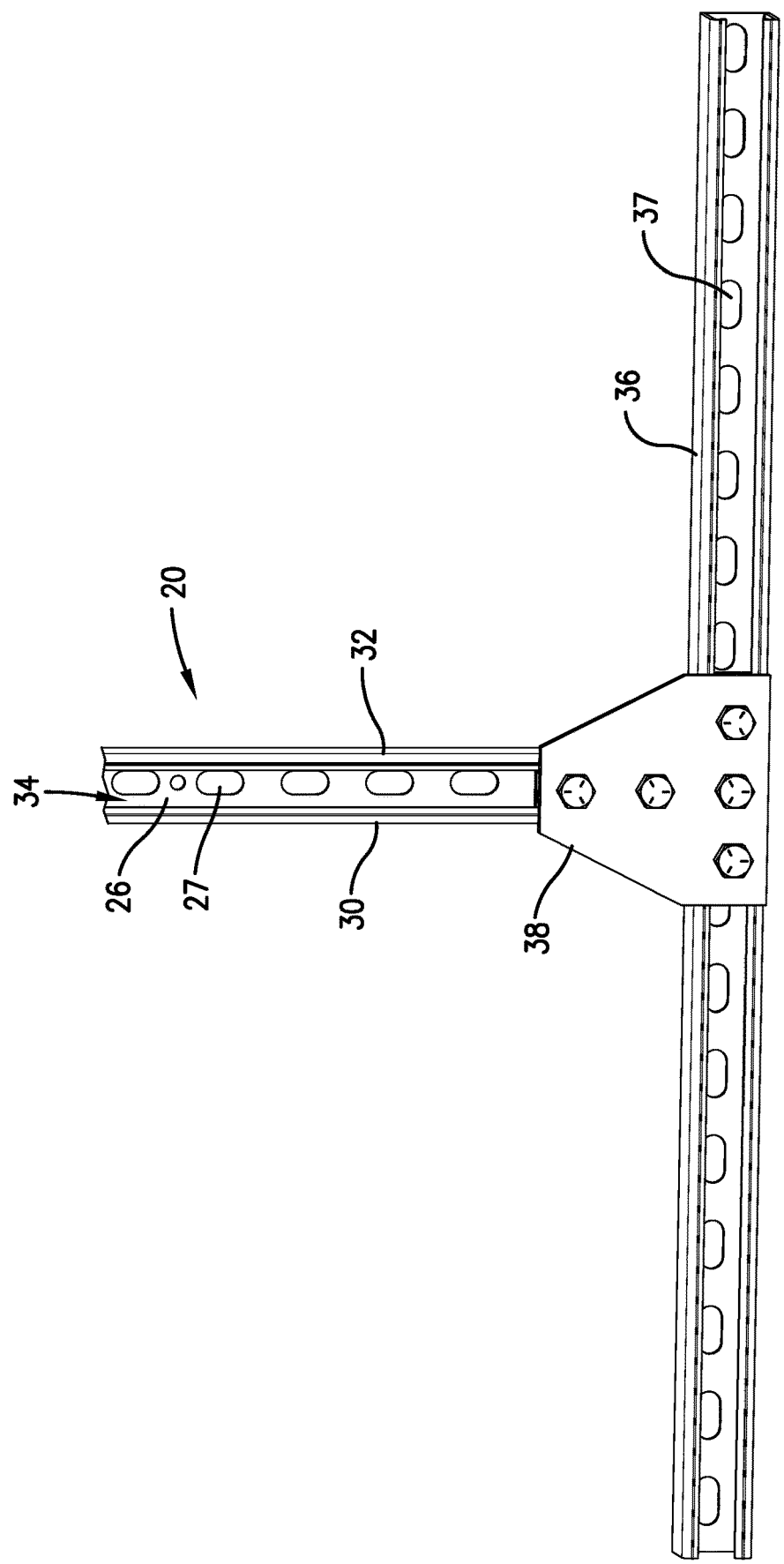
FIG. 2 is a partial front view of a track secured to a stabilizing member according to one embodiment of the present invention.
Figure 3:
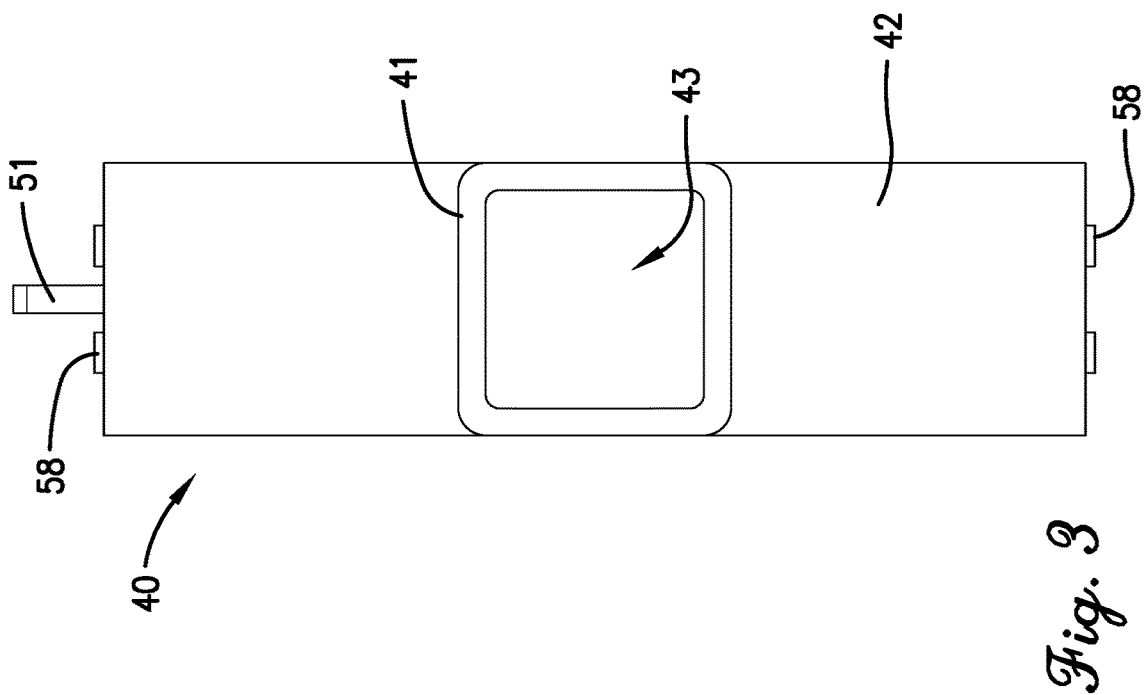
FIG. 3 is a front view of a trolley assembly according to one embodiment of the present invention.
Figure 4:
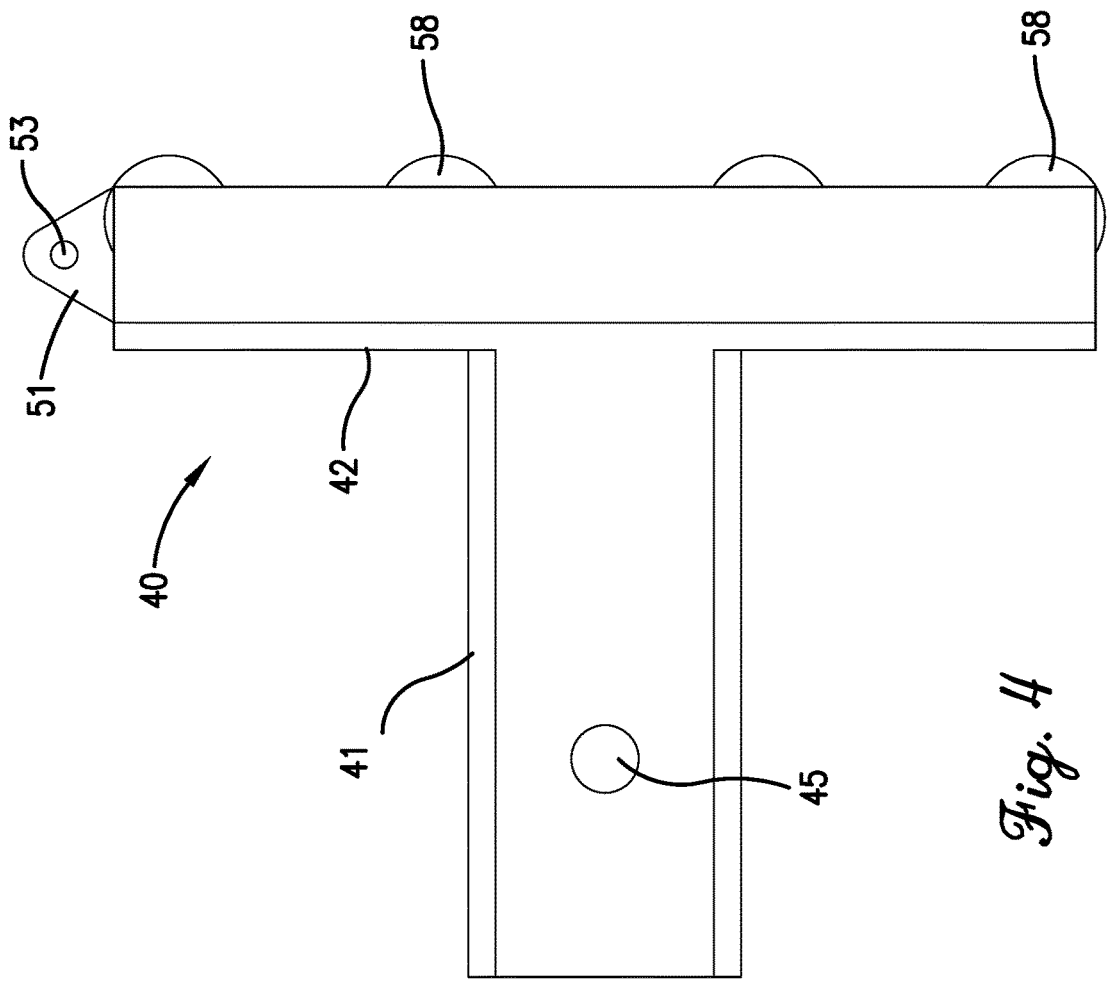
FIG. 4 is a side view of a trolley assembly according to one embodiment of the present invention.

Track 20 generally comprises a first end 22 and a second end 24. As shown in the embodiment of FIG. 1, first end 22 may be positioned adjacent the ceiling, while second end 24 may be positioned adjacent the floor 14. Track 20 generally defines a longitudinally extending path between first end 22 and second end 24. As best shown in FIG. 2, track 20 generally comprises base portion 26 configured to be positioned adjacent a surface, such as the surface of vertical wall 11 (FIG. 1), a floor, a ceiling, or other structure. Base portion 26 may include one or more holes 27 formed therein, which may be used in conjunction with one or more fasteners (not shown), such as lagbolts and/or screws, to secure track 20 to the surface. In certain embodiments, track 20 further comprises a pair of laterally spaced side rails 30 and 32 extending from base portion 26 away from the surface to define channel 34 extending along the path. In certain embodiments, base portion 26 and side rails 30 and 32 run at least 50%, at least 60%, at least 70%, at least 80%, at least 90%, or the full length of the track path, such that wheels 58 of trolley assembly 40 (described below) can contact base portion 26 at all times during translational shifting of trolley assembly 40. The positioning of wheels 58 within track 20 allows trolley assembly 40 to move freely along the path, for example, in a vertical motion to lift any attached carrier and/or articles from the proximity of floor 14 to the upmost storage position. Side rails 30 and 32 may further include a protrusion 33, shown in FIG. 6 as a hooked edge, which can be used to further secure trolley assembly 40 to track 20, as described in greater detail below.

Figure 13:
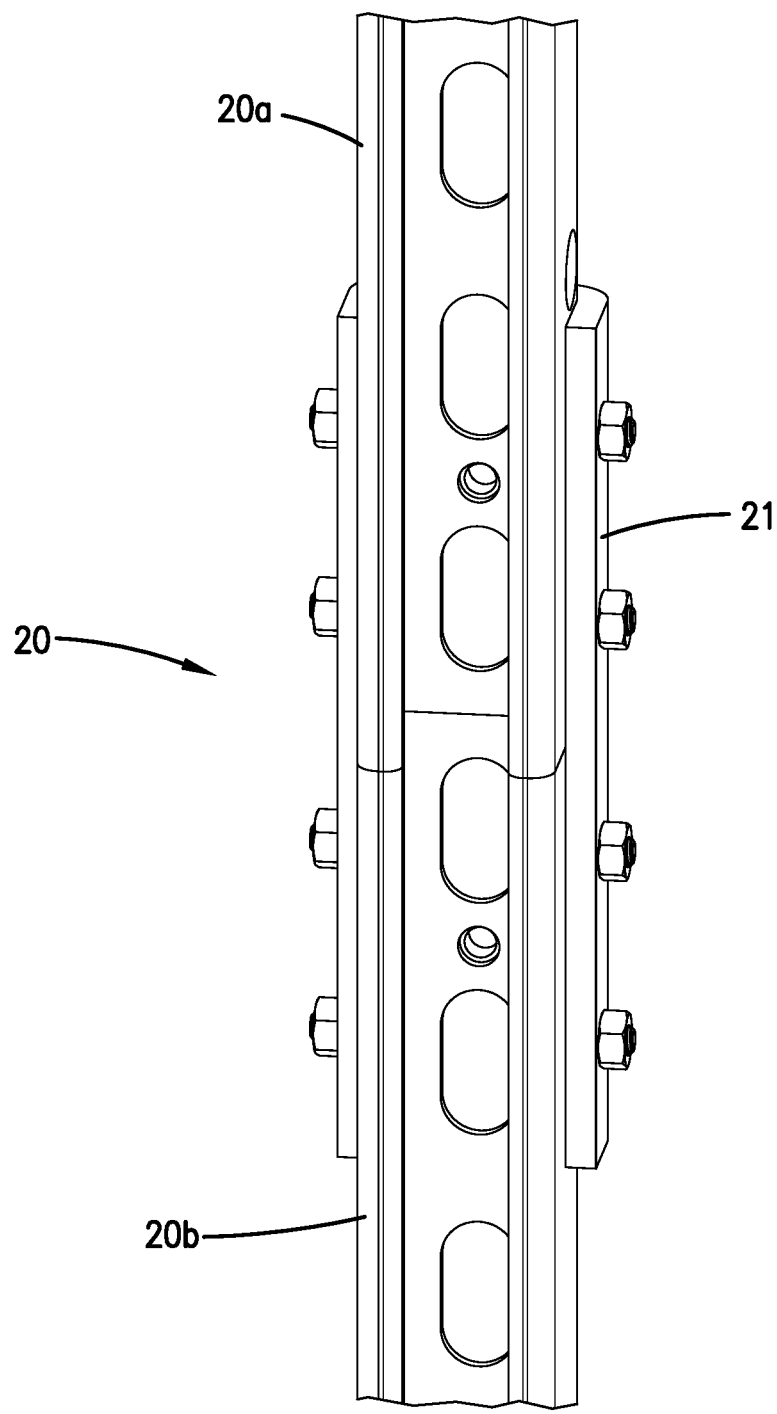
FIG. 13 is a partial perspective view of connected track portions according to one embodiment of the present invention.

Side rails 30 and 32 should be spaced apart sufficiently such that at least a portion of trolley assembly 40 can reside within channel 34. Track 20 is preferably made of steel or aluminum material. Advantageously, in certain embodiments, track 20 may be partially or entirely constructed using readily available and relatively affordable products, including commercially available metal framing products, such as Unistrut® metal framing systems. In certain embodiments, any portion of track 20 may be provided as shorter track segments 20a and 20b, which can be assembled by the end user, which may allow for installation in areas with shorter ceilings, as well as easier transport and installation. Additionally or alternatively, in certain embodiments, track 20 can be sized to length depending on the height or other dimension of the ceiling, either by the manufacturer or the end user. In certain such embodiments, the end user can cut a portion of track 20 at the point of installation so as to reduce its length. For example, in one particular embodiment, track 20 may be provided at a length to support a ten foot ceiling, and the end user can cut twelve inches from the second end 24 prior to installation to accommodate a nine foot ceiling. As shown in the embodiment of FIG. 13, track segments 20a and 20b can be connected using bracket 21 (along with respective nuts and bolts) or other mechanism such that segments 20a and 20b are combined to make up a larger portion, or the full length, of track 20.

Figure 14:
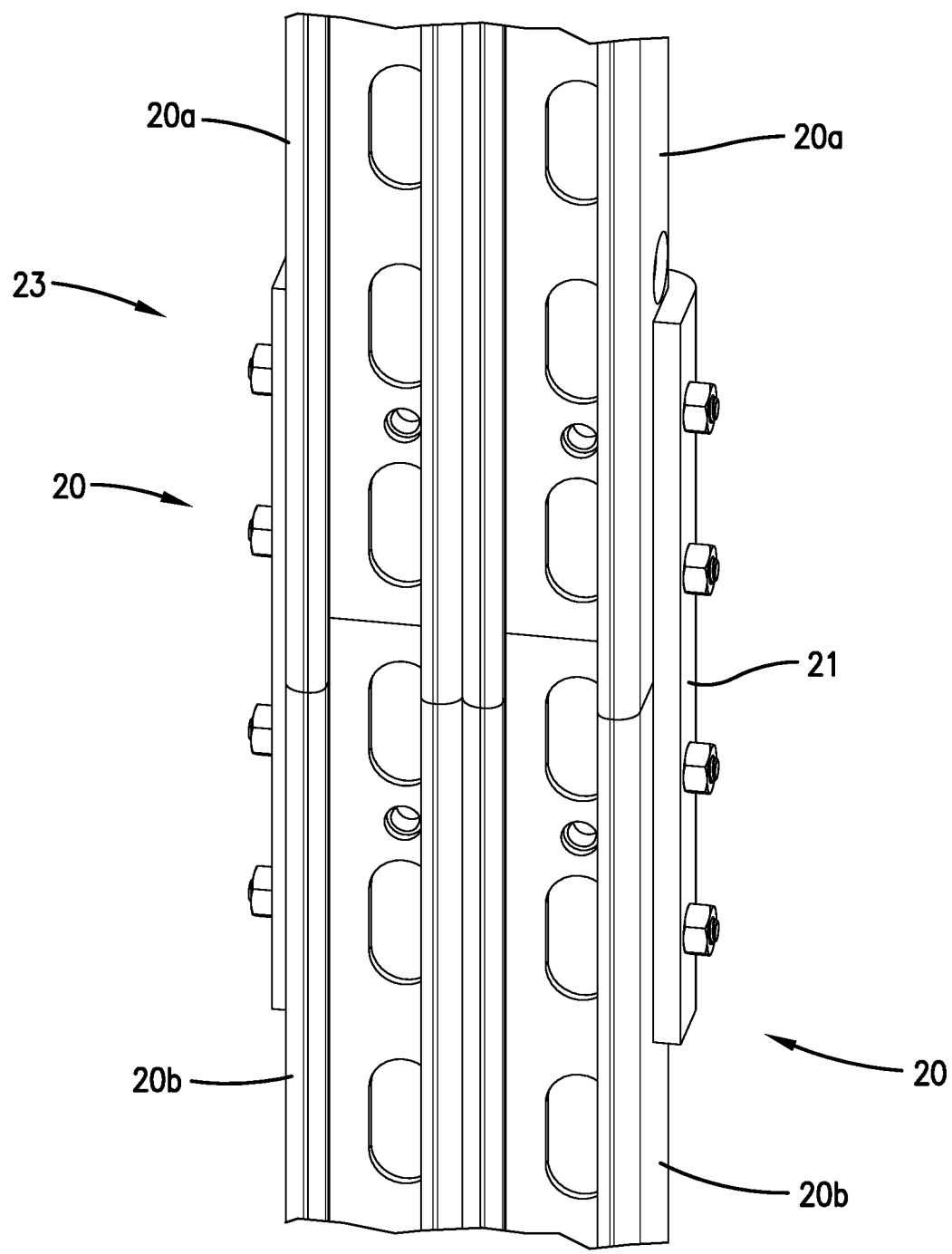
FIG. 14 is a partial perspective view of a two-channel track according to one embodiment of the present invention.

In certain additional or alternative embodiments, track 20 may comprise two or more tracks 20 coupled together and arranged in a parallel configuration to form a track assembly 23, as shown in FIG. 14. In certain such embodiments, one or more of the tracks 20 may comprise track segments 20a and 20b, which may allow for easier installation of track assembly 23. The one or more tracks 20 and/or track segments 20a and 20b may be secured together by bracket 21. The use of track assembly 23 provides increased stability and allows the use of larger, stronger trolley assemblies and/or drive units. The use of track assembly 23 may require modifications to trolley assembly 40, as described in greater detail below.

In certain embodiments, track 20 further comprises one or more stabilizing members 36, which can increase the structural stability along with additional securement to the surface (e.g., wall, ceiling, floor, etc.). As illustrated herein, stabilizing members 36 are elongated structures affixed to track 20 and arranged perpendicular to the path between first end 22 and second end 24. In certain embodiments, stabilizing members 36 are positioned and configured to be secured to a portion of the surface that is substantially coplanar to the portion of the surface where the base portion 26 of track 20 is secured. As shown in FIG. 1, a first elongated stabilizing member 36a may be attached to the first end 22 of track 20 and positioned adjacent the surface of vertical wall 11 toward the ceiling, and a second elongated stabilizing member 36b may be attached to the second end 24 of track 20 and positioned adjacent the surface of vertical wall 11 toward the floor 14. Stabilizing members 36 may be made of the same or different materials as track 20. As shown in FIG. 2, each stabilizing member 36 may be attached to track 20 using bracket 38 and common fastening hardware, such as nuts and bolts. In certain embodiments, specialized channel nuts and hardware may be used, including spring-loaded nuts that can be placed within track 20 and assemble the plates, bolts, and track 20 together, such as those manufactured by Unistrut®. Similar to base portion 26, each stabilizing member 36 may include one or more holes 37 formed therein, which may be used in conjunction with one or more fasteners (not shown), such as screws, to secure stabilizing member 36 to wall 12.

Figure 6:
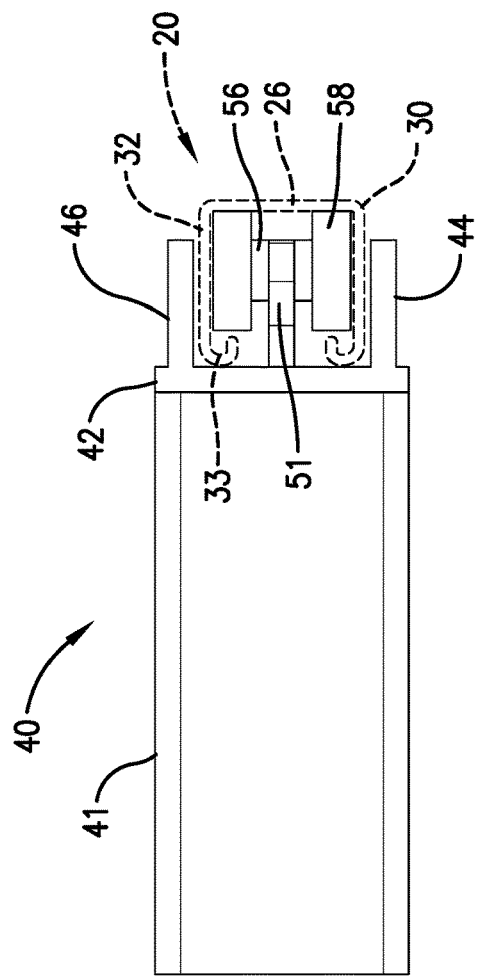
FIG. 6 is a bottom view of a trolley assembly coupled to a track according to one embodiment of the present invention.

Trolley assembly 40 is coupled to track 20 for translational shifting along the track path. As best shown in FIGS. 3-7, trolley assembly 40 generally comprises a trolley body 42, a pair of opposing sidewalls 44 and 46 extending from the trolley body 42, and a roller assembly 50 positioned between the pair of opposing sidewalls 44 and 46. Trolley body 42 may be provided as a unitary member which is cast or machined to shape, or alternatively comprise of multiple components. Trolley body 42 may have an elongated rectangular shape, such as shown in the figures, although trolley body 42 may take other shapes and designs as necessary or desired. The pair of sidewalls 44 and 46 extend from trolley body 42 to define a trough segment 48 therebetween. As best shown in FIG. 6, when coupled to track 20, the pair of opposing sidewalls 44 and 46 are positioned lateral to and substantially parallel to the pair of laterally spaced side rails 30 and 32 such that sidewalls 44 and 46 at least partially cover side rails 30 and 32, and side rails 30 and 32 at least partially reside within trough segment 48. The positions of sidewalls 44 and 46 relative to side rails 30 and 32 advantageously inhibits the track channel 34 from spreading during operation and thus ensures the transported or lifted load does fall during operation or storage.

Figure 7:
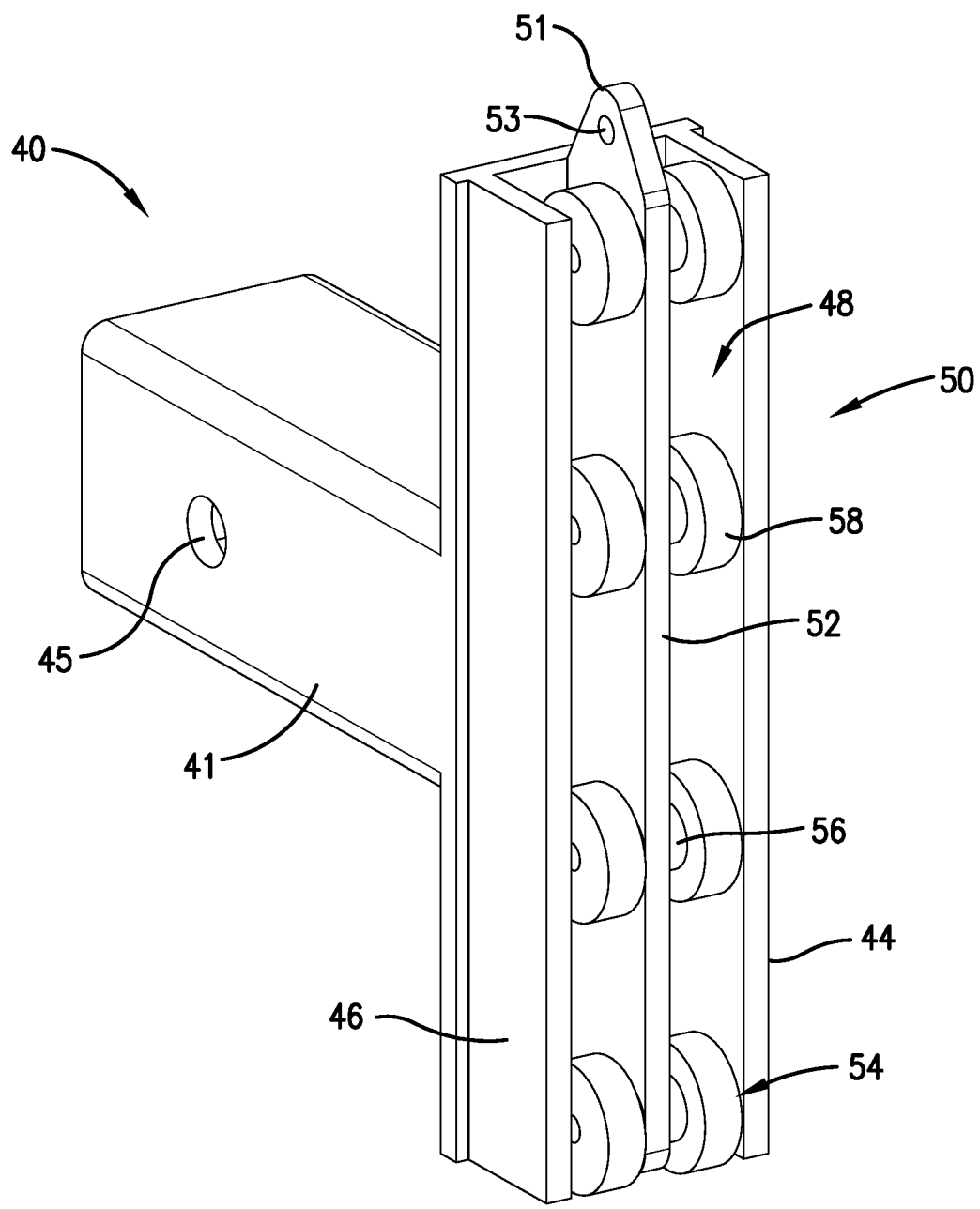
FIG. 7 is a perspective view of a trolley assembly according to one embodiment of the present invention.

Roller assembly 50 is generally positioned below trolley body 42 and between sidewalls 44 and 46 within trough segment 48 (See FIG. 7). When trolley assembly 40 is coupled to track 20, roller assembly 50 at least partially resides within track channel 34. Specifically, roller assembly 50 is preferably configured such that side rail 30 is positioned between roller assembly 50 and sidewall 44, and that side rail 32 is positioned between roller assembly 50 and sidewall 46. As best shown in FIG. 7, in certain embodiments, roller assembly 50 may comprise a central member 52, which extends from trolley body 42 and is positioned between sidewalls 44 and 46 in trough segment 48. In certain embodiments, central member 52 may be mechanically connected to the drive member 60 so as to couple drive member 60 to trolley assembly 40. In certain embodiments, central member 52 may comprise a tab 51 having an eyehole 53 formed therein. Drive member 60 may be connected to tab 51 via eyehole 53 using any of a number of attachment mechanisms, including hooking and locking mechanisms, such as the U-shaped pin anchor shackle 55 illustrated herein. In other embodiments, however, drive member 60 may be coupled to trolley assembly 40 using other connection mechanisms and at locations other than tab 51 or central member 52.

As shown in FIG. 15, in certain embodiments, central member 52 may comprise a second tab 57 at the opposing end of central member 52 from tab 51 and having a second eyehole 59 formed therein. The use of a second tab 57 and eyehole 59 allows for two or more trolley assemblies 40 to be coupled to track 20 in a colinear arrangement, as shown in FIG. 16. The two or more trolley assemblies 40 can be coupled together by connecting member 49, shown in FIG. 16 as being secured to tabs 51, 57 via eyeholes 53, 59 of the trolley assemblies 40. In certain embodiments, connecting member 49 is rigid, thereby maintaining a specific distance between the two or more trolley assemblies, although non-rigid connecting members may also be used, such as cable or rope. In certain embodiments, the distance between the two or more trolley assemblies is about 6 inches to about 10 feet, preferably about 12 inches to about 5 feet, and more preferably about 16 inches to about 16 feet.

Figure 5:
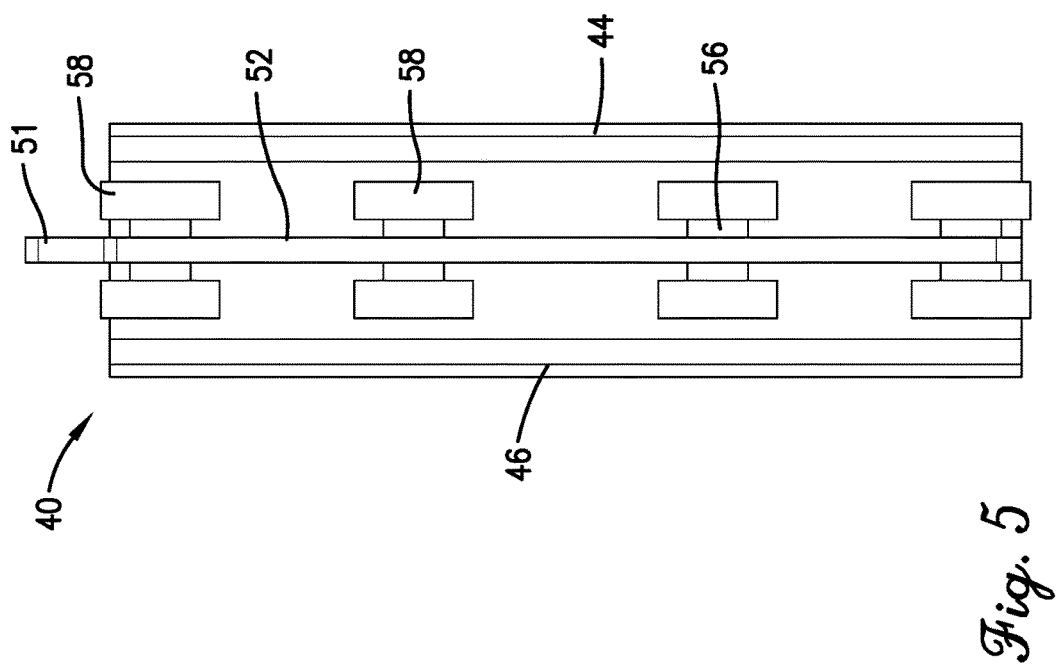
FIG. 5 is a back view of a trolley assembly, particularly showing the roller assembly, according to one embodiment of the present invention.

As illustrated herein, central member 52 may further comprise one or more wheel assemblies 54 comprising axle component 56 and one or more wheels 58. Wheels 58 are generally configured to engage with track 20 so as to facilitate translational shifting of trolley assembly 40 along the path of track 20. As shown in the embodiments herein, each wheel assembly 54 may comprise a pair of wheels 58 coupled to axle component 56 on either side of central member 52. In certain embodiments, roller assembly 50 may comprise at least two, at least three, or at least four (or more) wheels 58 arranged colinearly below trolley body 42, which can be positioned adjacent base portion 26 when coupled with track 20. In certain embodiments, one or more of wheels 58 can be configured to contact base portion 26 and/or protrusion 33 during translational shifting of trolley assembly 40 along the path of track 20. Therefore, trolley assembly 40 is advantageously coupled with track 20 such that the wheels 58 engage with front (protrusion 33) and the back (base portion) of the track 20, and the sidewalls 44 and 46 ensure that the wheels 58 will not disengage from the track 20 during operating and/or storage. In certain embodiments, roller assembly 50 may comprise at least two, at least three, at least four (as shown in FIG. 5), or more wheels 58 (or pairs of wheels) arranged colinearly within trough segment 48. Advantageously, in certain embodiments, the height and positioning of the wheels 58 are aligned such that the wheel(s) 58 positioned toward first end 22 will contact the front portion of 20 track (e.g., protrusions 33) at the same time as the wheel(s) 58 positioned toward second end 24 contact the back of track 20 (e.g., base portion 26). In certain embodiments, and particularly when installed on a vertical wall, this configuration allows trolley assembly 40 (and any attached carrier) to remain horizontal to floor 14 and perpendicular to the vertical travel path of trolley assembly 40 during operation of the system, thereby improving the stability and safety of the system.

In certain embodiments, and particularly when used in conjunction with track assembly 23 (see FIG. 14), trolley assembly 40 does not include a central member residing within trough segment 48. In certain such embodiments, wheels 58 reside within trough segment 48 (so as to protect the wheels) but are attached to one or both of sidewalls 44 and 46. Thus, in such embodiments, wheels 58 engage with the outer side rails 30 and 32 of the tracks 20 comprising track assembly 23.

Trolley assembly 40 may further comprise additional hardware as necessary or desired, including tensioners and/or bushings, for example to reduce vibration and facilitate smooth shifting of trolley assembly 40 during operation. However, in certain embodiments, the weight of the trolley assembly 40 and the load placed thereon is sufficient to maintain acceptable tension on drive member 60 such that no tensioner is necessary or present with trolley assembly 40. Moreover, the arrangement of the sidewalls 44 and 46 side and side rails 30 and 32, as described herein, provides adequate stability to system 10 such that no additional tensioning or stabilizing hardware is necessary or present on trolley assembly 40. Thus, embodiments described herein provide an advantageously simple design having less components than prior lift and storage, or transport and storage, designs.

Trolley assembly 40 may further comprise a collar 41 extending substantially perpendicular to trolley body 42 and thus perpendicular to the path of travel of trolley 40 defined by track 20. In the embodiments illustrated herein, collar 41 defines therewithin a substantially square channel 43 and may be substantially centrally mounted on trolley body 42. The channel 43 is sized to receive a carrier, such as a bicycle rack or cargo carrier, in mating relationship therein. In the preferred embodiment as illustrated, collar 41 is shaped and sized the same as a standard towing receiver hitch, and thus channel 43 is square in shape to maintain the desired orientation of the carrier. Collar 41 may be provided with securement holes 45 to receive a retaining pin therethrough.

Figure 8:
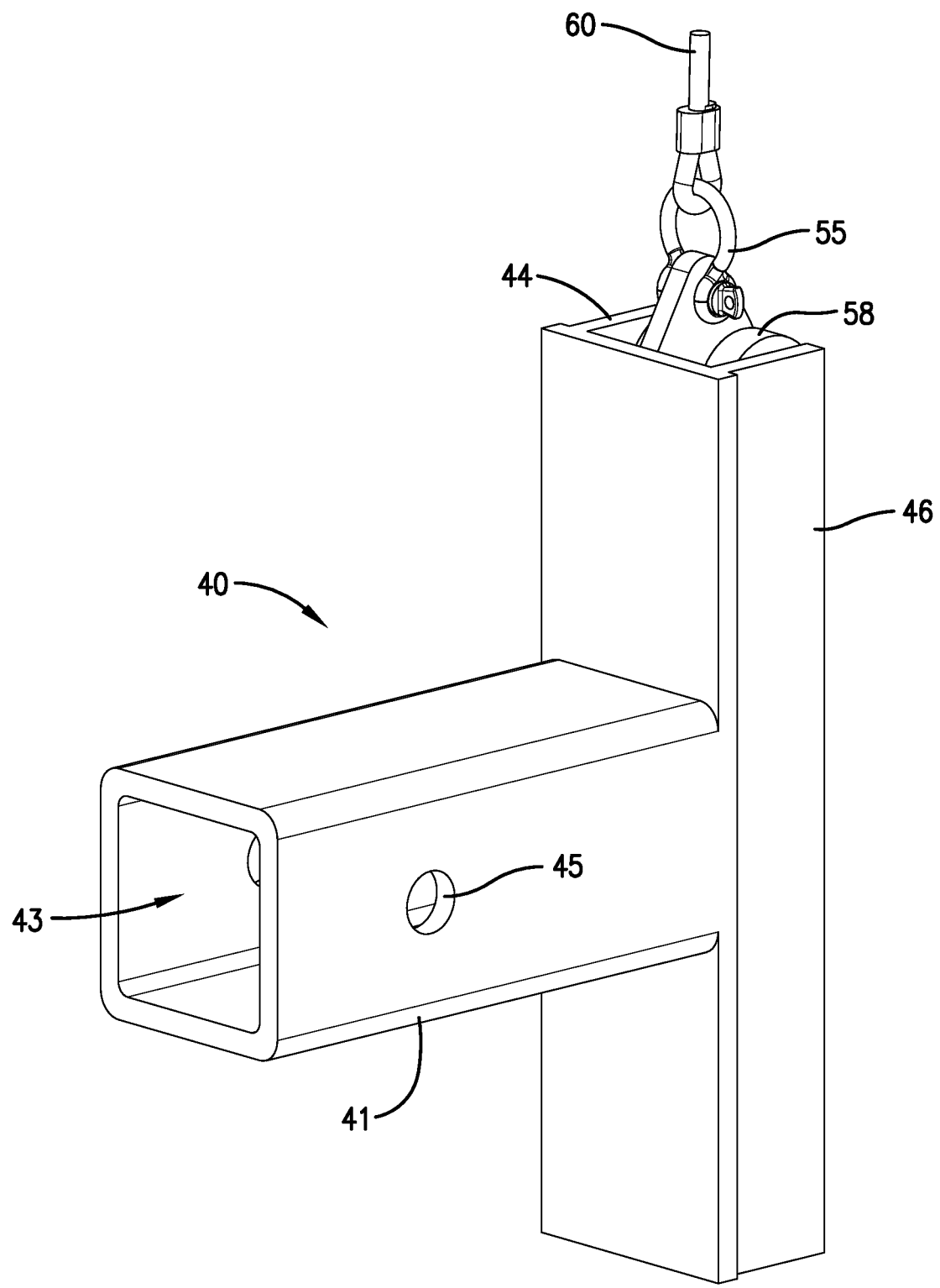
FIG. 8 is a perspective view of a trolley assembly coupled to a drive member according to one embodiment of the present invention.
Figure 9:
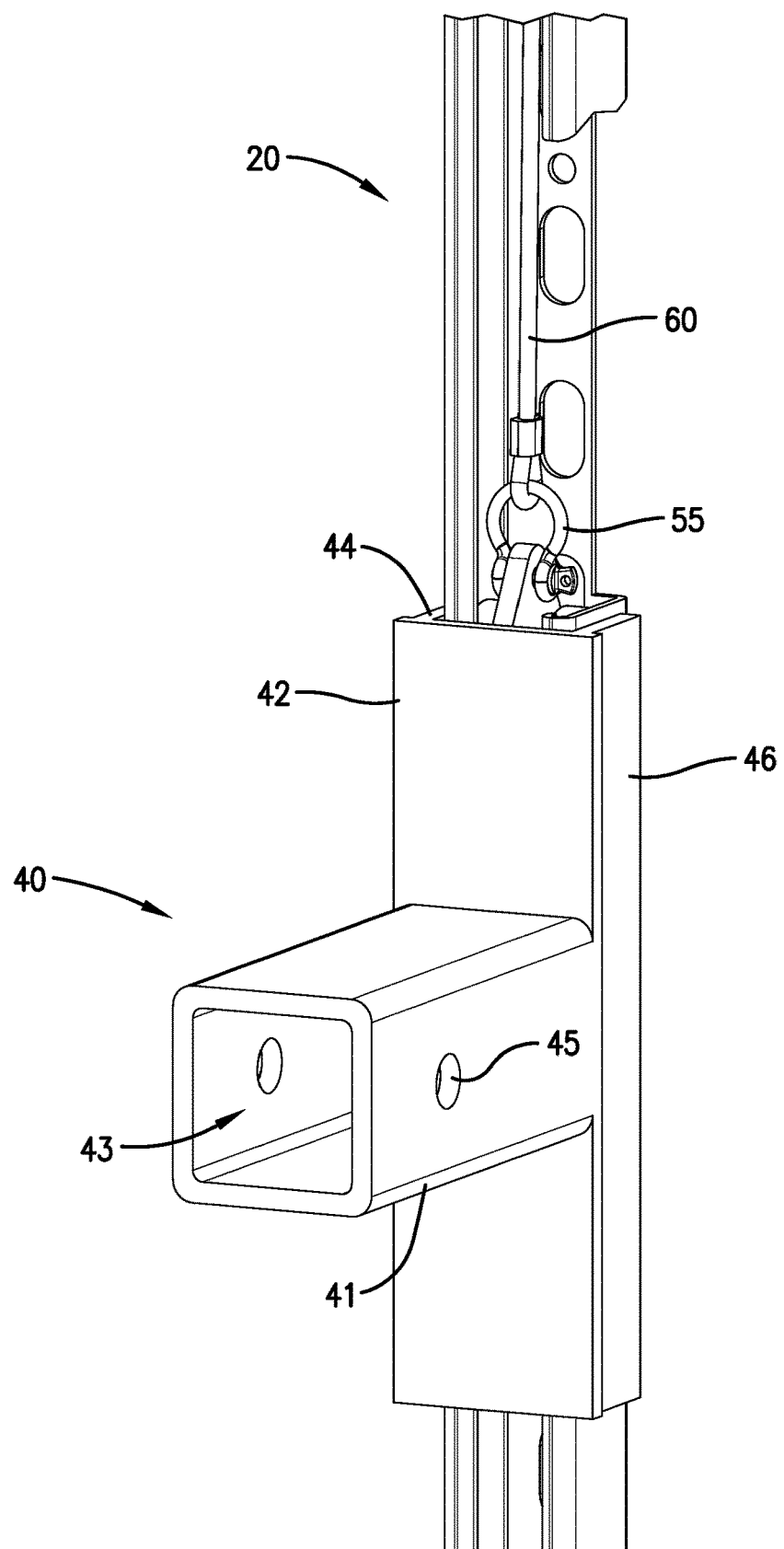
FIG. 9 is a perspective view of a trolley assembly coupled to a drive member, with a partial cutaway showing the trolley assembly and drive member residing within a track, according to one embodiment of the present invention.

Drive member 60 may be provided in various structures. However, as shown in FIG. 8 and FIG. 9, drive member 60 can be provided in the form of a drive cable or chain, which extends from tab 51 up to a pulley 72 and hoist spool 74 of drive unit 70. As shown in FIG. 9, drive member 60 resides at least partially (or entirely) within channel 34 of the track 20 along the path between the trolley assembly 40 and drive unit 70. By being positioned within channel 34, drive member 60 can be better protected from accidental bumping or shaking, which improves the stability and safety of the system 10.

Although drive member is illustrated herein as a cable, it may be readily appreciated that the drive member 60 can be provided as a drive chain, wherein the aforementioned drive pulley 72 of the drive unit 70 is provided as a drive sprocket and either a return spool or a return idler sprocket may be used at the second end 24 of the track 20. When a drive chain is employed as the drive member 60, a master link may be placed at each end of the chain and the chain pin of the remote end of the master link is inserted through the eyehole 53 in tab 51. Additionally, the drive member may be provided as a screw drive unit wherein the drive unit 70 rotates an elongated threaded rod extending the length of the track 20 to a bearing adjacent track end 24 or the floor, and the trolley assembly 40 mounts a threaded follower which moves the trolley assembly 40 along the path, for example upwardly or downwardly when installed on a vertical wall, or horizontally from one position to another when installed on a horizontal surface such as a ceiling or floor, corresponding to the rotation of the threaded rod.

Figure 10:
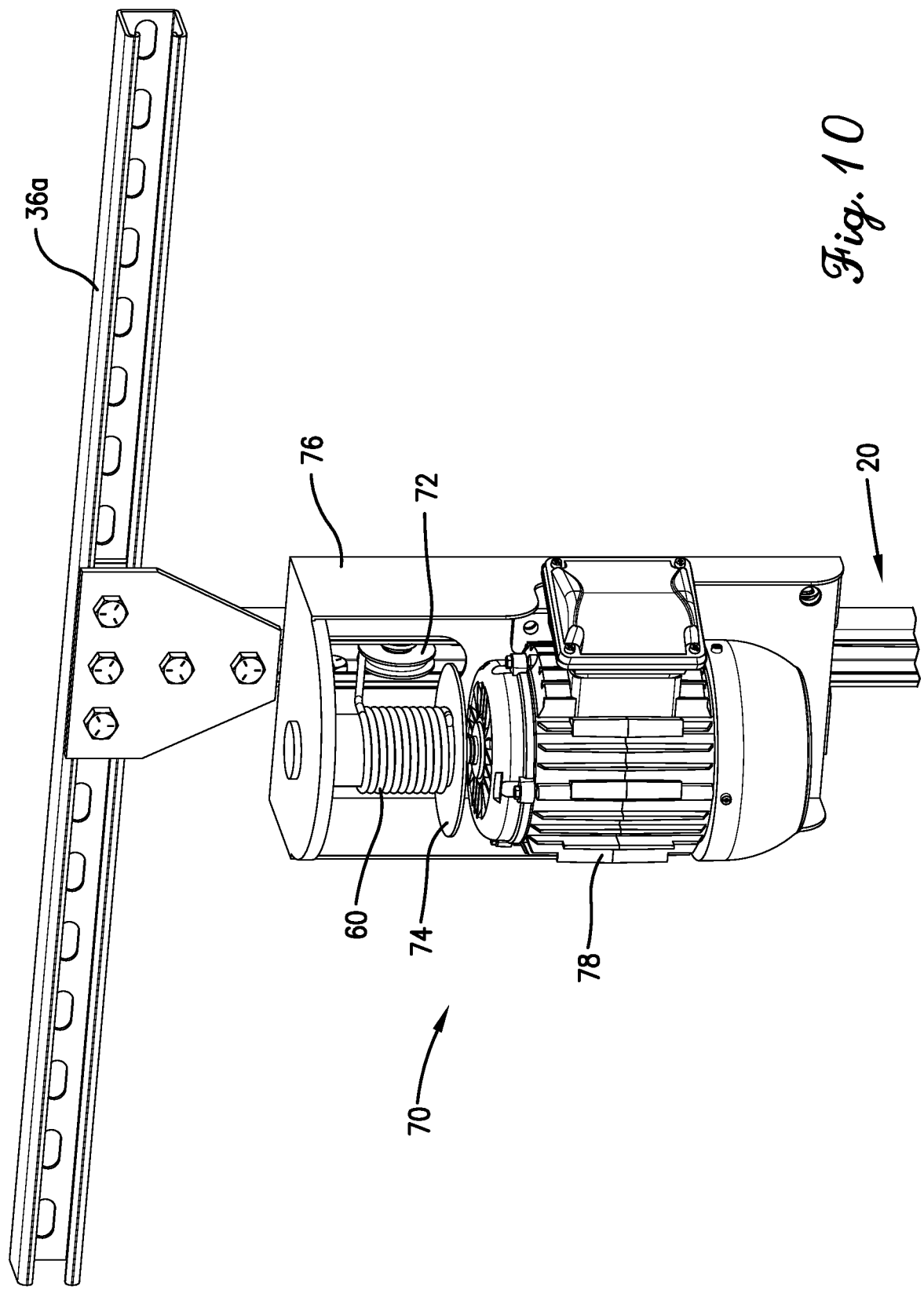
FIG. 10 is a perspective view of a drive unit according to one embodiment of the present invention.
Figure 11:
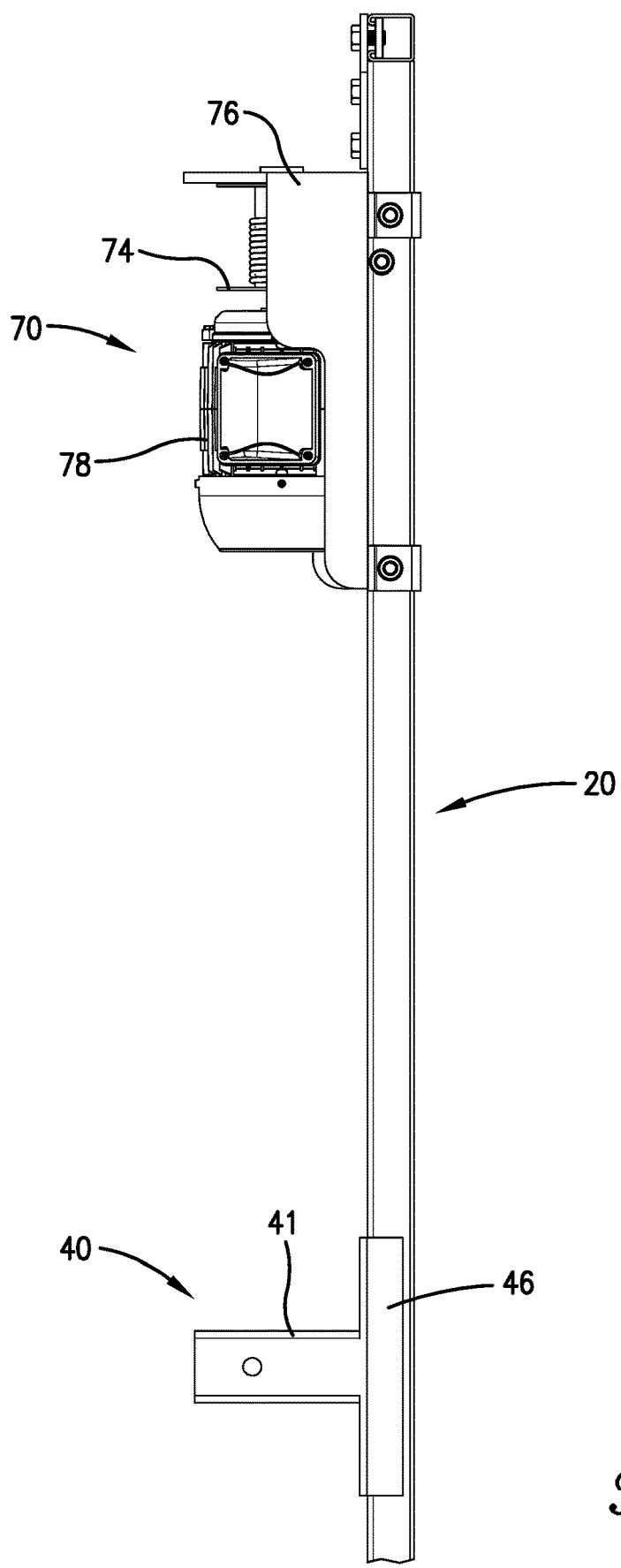
FIG. 11 is a side view of a lift and storage system according to one embodiment of the present invention.

The drive unit 70 is operatively coupled to drive member 60 for translating the trolley assembly 40 along the path of track 20. Advantageously, in certain embodiments, drive unit 70 is affixed to track 20 adjacent the same surface (e.g., wall, ceiling, floor) as track 20, which allows for easier and safer installation of the storage system compared to existing systems requiring installation on multiple surfaces (i.e., both a vertical wall and ceiling). In certain such embodiments, the base portion 26 of track 20 is secured to a first portion of the surface and drive unit 70 is affixed to track 20 adjacent a second portion of the surface, wherein the first portion of the surface and the second portion of the surface are substantially coplanar. Drive unit 70 may comprise any of a number of configurations and may be operated manually or automatically, so long as drive unit 70 is operable to effect translation of trolley assembly 40. As illustrated in FIG. 10, drive unit 70 is generally affixed to the first end 22 of track 20. As shown herein, in certain embodiments, drive unit 70 may comprise pulley 72, hoist spool 74, and mount 76. In certain embodiments, and particularly when drive member 60 is a cable, drive member 60 is secured to hoist spool 74 (and wrapped around spool 74 when the trolley assembly is in the lifted position) and runs from hoist spool 74 into channel 34 of track 20. The drive member 60 cable is thread around pulley 72, which resides at least partially within channel 34, and is directed toward trolley assembly 40.

In certain embodiments, drive unit 70 is a motor drive unit and comprises motor unit 78 coupled to spool 74. Motor unit 78 includes a motor which is preferably powered by electrical current provided by a wall socket and is reversible. Any of a variety of motors can be used in accordance with certain embodiments of the present invention, and the size and power can be selected based on the weight of the carrier and/or article to be stored. In certain embodiments, motor unit 78 comprises an electric hoist motor, such as a PART-Sam® electric hoist. In certain embodiments, in order to limit damage or injury, motor unit 78 preferably is provided with a single phase motor having instant reversing features and a solenoid actuated brake to prevent coasting and an adjustable length of travel control integral thereto. In certain embodiments, motor unit 78 is commercially available as garage door opener motor units, and a preferable motor drive unit 78 suitable for lifting relatively heavy loads is a Liftmaster® Model MT. When a drive cable is used as the drive member 70, the drive sprocket normally provided in the Liftmaster® Model MT is replaced by a drive pulley, but when a drive chain is used as the drive member, the original drive sprocket is retained.

Figure 12:
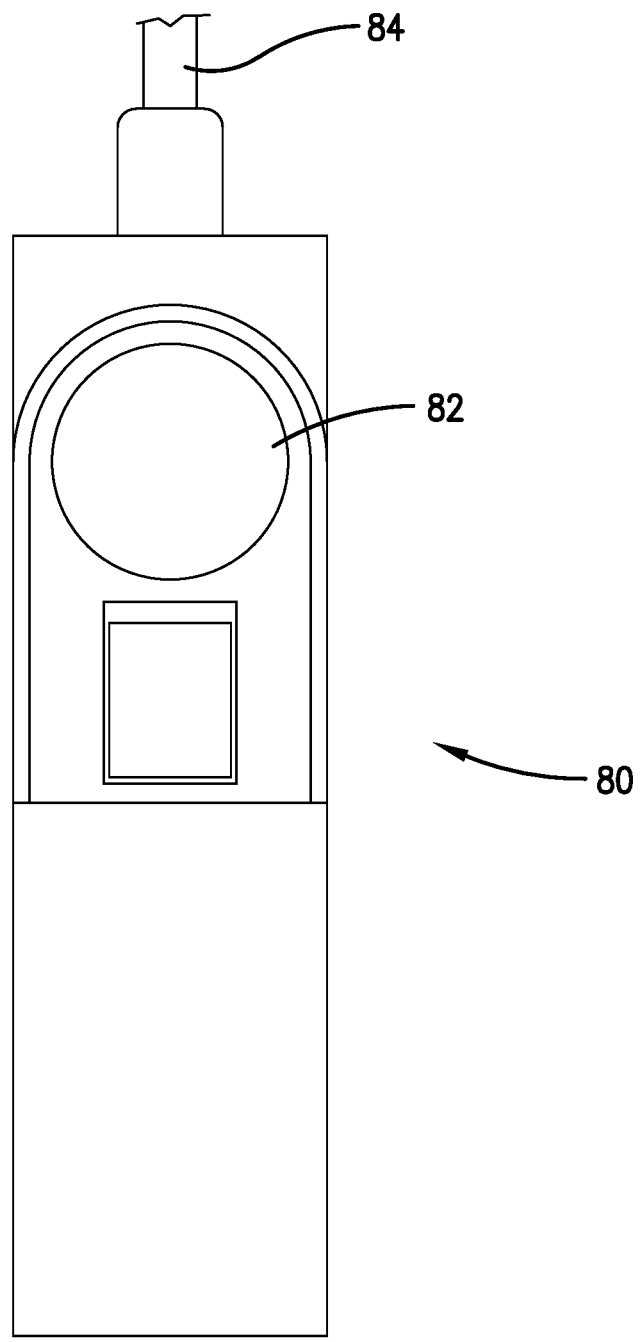
FIG. 12 is a front view of an actuator according to one embodiment of the present invention.

In certain embodiments, system 10 further comprises an actuator 80 employed to initiate the motor drive unit 70. In certain embodiments, actuator 80 may be a switch operatively coupled to the motor drive unit 70 by a wire or a radio transmitter. As shown in FIG. 12, actuator 80 may be mounted on vertical wall 11 comprising a button or switch 82 configured to initiate operation of motor drive unit 78 and control cable 84 to transmit the signal from button or switch 82 to motor drive unit 78. In certain embodiments, button or switch 82 includes a safety feature, which will not allow the unit to operate until the intended user (e.g., an adult, rather than children) twists the button to release it. In this way, button or switch 82 functions similar to a safety lid on a medicine bottle. Generally, actuator 80 can mounted on wall 11 a safe distance from track 20 but still connected to drive unit 70 via control cable 84. In certain embodiments, control cable 84 is about 5 feet to about 100 feet in length, preferably about 10 feet to about 50 feet in length, and more preferably about 15 feet to about 25 feet in length. The length of control cable 84 may be selected, for example, so as to run along wall 11 and the adjacent ceiling to about 5 feet to about 50 feet away from track 20, and preferably about 10 feet to about 20 feet away from track 20. In certain embodiments, actuator 80 is mounted on vertical wall 11 at least about 4 feet, at least about 5 feet, or at least about 6 feet above floor 14, so actuator 80 is not accessible to children. In certain additional or alternative embodiments, operation of drive unit 80 may be initiated by a wireless and/or battery-operated controller. Such wireless controllers may include, for example, a smart phone application.

System 10 may further comprise other additional or alternative safety features. In certain embodiments, to prevent the operation of the system 10 when small children are unattended, a safety bolt or latch may be secured to side rails 30 and 32 of track 20. Engagement by the trolley assembly 40 with such a bolt or latch will cause sufficient resistance that the motor drive unit 70 will immediately stop movement.

In use, track 20 receives trolley assembly 40 in the channel 34 created between side rails 30 and 32. As described herein, drive unit 70 is affixed to track 20, for example via mount 76, using common nuts and bolts through complementally located holes. In the embodiment of FIG. 1, system 10 is positioned in an upright and preferably vertical orientation with the drive unit 70 atop the track 20 at first end 22. Track 20 may be secured to vertical wall 11 using known fasteners and holes 27 in base portion 26. Same or similar hardware may be used to secure track 20 to a horizontal surface, such as a ceiling or floor. The drive member 60, if a cable or chain, may be tensioned by threading the drive member 60 through pulley 72, securing drive member 60 to hoist spool 74 and trolley assembly 40, and rotating the hoist spool 74 until any undesired slack is removed.

Motor drive unit 70 may comprise travel limit switches, which may be set according to the desired position of the trolley assembly 40. For example, in the case of a bicycle carrier, the lower limit of travel may be more elevated to allow the user to place bicycles thereon, whereas when using a cargo carrier, the lower limit of travel of the trolley assembly may be lower and adjacent the floor 14 at second end 24.

Upon engagement of drive unit 70, for example by initiation by actuator 80, drive unit 70 begins operation to translationally shift trolley assembly 40 along the path of track 20. In the embodiment illustrated herein, hoist spool 74 rotates, thereby wrapping drive member 60 around the spool and shortening the length of drive member 60 within channel 34 of track 20. Thus, in certain embodiments, the carrier, such as a bicycle rack or cargo carrier, may be raised from the floor 14 toward the ceiling (i.e., from second end 24 toward first end 22). Conversely, the carrier may also be lowered by engaging drive unit 70 (for example by initiation of the actuator) to reverse such that the spool hoist 74 is rotated in the opposite direction, thereby increasing the length of drive member 60 within channel 34, and lowering trolley assembly 40 (and the carrier) toward floor 14 (i.e., from first end 22 toward second end 22). When system 10 is installed on a substantially horizontal surface, trolley assembly 40 may be translated from one position to another along the horizontal surface using the same or similar operation.

As described herein, the transport and storage system 10 may include a carrier (not shown) secured to trolley assembly 40, which includes the article to be stored. The carrier may be configured to accommodate a specific article to be carried, such as bicycle rack. Such bicycle racks are also often capable of carrying skis and are designed for insertion into an automobile towing receiver, and are commercially available as Model 2534 from Yakima of Arcadia, Calif., as well as from Rhode Gear, a division of Bell Sports, the-hitch.com, the B.A.T. rack from Saris, and a variety of racks by Thule and Curt, among others. Other examples of hitch mounted carriers include barbeque grills and ski racks. The carrier may also be in the form of a cargo carrier. In certain embodiments, the cargo carrier may be advantageously positioned on or adjacent the floor 14 to permit the use of hand trucks or objects on wheels to be simply rolled adjacent or onto the cargo carrier, thereby permitting loading without lifting. Other articles that may be stored using the transport and storage system 10 include, but are not limited to, push lawn mowers, kayaks, boats, camping gear, and power washers.

The system described herein is advantageously capable of securing, lifting or transporting, and safely storing irregularly shaped articles, such as bicycles and skis, in a way which maximizes the usable floor space when access to the articles are not needed. In certain embodiments, the system provides a lift and storage system which can safely elevate at least one article out of high traffic or otherwise useful spaces. In certain other embodiments, the system provides a transport and storage system which can shift at least one article across a horizontal surface, such as a ceiling or floor, for safe storage. The system enables the articles to be stored in safe and secure locations, minimizing exposure of both the article and the user to damage or danger, and also avoiding damage by tipping, impact or continuous moving. The system desirably may be manufactured inexpensively and with current technology. Furthermore, the system can use existing transport carriers capable of coupling to a hitch type receiver, thereby further minimizing storage problems.

In addition, the present invention is easily adaptable to transport, lift, and/or store a wide variety of different articles which currently present storage problems. The ability to employ common components in a variety of adaptations will provide a superior manufactured product. The simplicity and elegance of construction also contributes to superior transporting and/or lifting capability. Advantageously, the system according to certain embodiments of the present invention provides ease of installation and/or requires minimal wall space, little or no floor space, and minimal maintenance. The present invention also enables storage and retrieval of articles with the push of a single button, provides a long service life, and safety options to inhibit the likelihood of exposure of small children to injury.

Although the embodiment of the storage system shown in FIG. 1 is described above as a lift and storage system for installation on a vertical wall, in certain embodiments of the present invention, the storage system may be designed and configured to be installed on a substantially horizontal surface, such as a ceiling or floor. In certain such embodiments, the storage system generally comprises any one or more of the same or similar components described above, including, but not limited to, the track, the trolley assembly, the drive member, the drive unit, and any one or more of their associated components.

For example, as shown in FIG. 17, an overhead transport and storage system 110 is provided mounted to a ceiling 116 of a structure, which permits articles to be shifted from one position to another along ceiling 116. Similar to the lift and storage system shown in FIG. 1, storage system 110 broadly includes a track 120, a trolley assembly 140, a drive member 160 coupled to the trolley assembly 40, and a drive unit 170 coupled to the drive member 160. Trolley assembly 140 is generally coupled to track 120 for translational shifting therealong. In certain embodiments, system 110 further includes an actuator 180, which may be installed on wall 111, for initiating operation of drive unit 170. In certain embodiments, trolley assembly 140 includes a carrier (not shown) removably coupled to trolley assembly 140.

Additional advantages of the various embodiments of the invention will be apparent to those skilled in the art upon review of the disclosure herein. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The invention claimed is:

1. A transport and storage system comprising:
    a track having a first end and a second end, and defining a longitudinally extending path therebetween, the track comprising a base portion configured to be secured to a surface and a pair of laterally spaced side rails extending from the base portion to define a channel along the path;
    a trolley assembly coupled to the track for translational shifting along the path, the trolley assembly comprising a trolley body, a pair of opposing sidewalls extending from the trolley body, and a roller assembly positioned between the pair of opposing sidewalls, the roller assembly being in contact with the base portion of the track and at least partially residing within the channel;
    a drive member coupled to the trolley assembly and at least partially residing within the channel; and
    a drive unit affixed to the first end of the track and operatively coupled to the drive member for translating the trolley assembly along the path.

2. The system of claim 1, wherein the trolley assembly comprises a collar extending substantially perpendicular to the trolley body and defining a substantially square channel.

3. The system of claim 1, wherein the pair of opposing sidewalls of the trolley assembly are positioned lateral to and substantially parallel to the pair of laterally spaced side rails of the track so as to at least partially cover the pair of laterally spaced side rails with the pair of opposing sidewalls.

4. The system of claim 1, the roller assembly comprising a central member positioned between the pair of opposing sidewalls and one or more wheel assemblies coupled to the central member.

5. The system of claim 4, wherein each of the one or more wheel assemblies comprises a pair of wheels coupled to, and positioned on either side of, the central member.

6. The system of claim 4, wherein the central member is mechanically connected to the drive member so as to couple the drive member to the trolley assembly.

7. The system of claim 1, wherein the roller assembly comprises three or more wheels arranged colinearly along the track path.

8. The system of claim 1, the track further comprising an elongated stabilizing member attached to the first end of the track and/or the second end of the track and positioned perpendicular to the track path.

9. The system of claim 1, wherein the track comprises one or more track segments secured together by a bracket.

10. A surface having the transport and storage system of claim 1 installed thereon.

11. The surface of claim 10, wherein the base portion is secured to a first portion of the surface, and wherein the drive unit is affixed to the track adjacent a second portion of the surface, wherein the first portion of the surface and the second portion of the surface are substantially coplanar.

12. The surface of claim 10, wherein the surface is an overhead interior surface.

13. A method of transporting and/or storing an article, the method comprising:
providing the transport and storage system of claim 1 installed on a surface;
securing the article to the trolley assembly; and
operating the drive unit so as to engage the drive member, thereby translating the trolley assembly along the path toward the first end or the second end of the track.

14. The method of claim 13, wherein the surface is an overhead interior surface.

15. The method of claim 13, wherein the article is secured with a carrier coupled to the trolley assembly.

16. A lift and storage system for installation onto a vertical wall, the system comprising:
a track having a first end and a second end and defining a longitudinally extending path therebetween, the track comprising a base portion configured to be positioned adjacent an exterior surface of the vertical wall and a pair of laterally spaced side rails extending from the base portion to define a channel along the path;
a trolley assembly coupled to the track for translational shifting along the path, the trolley assembly comprising a trolley body, a pair of opposing sidewalls extending from the trolley body, and a roller assembly positioned between the pair of opposing sidewalls, the roller assembly being in contact with the base portion of the track and at least partially residing within the channel;
a drive member coupled to the trolley assembly and at least partially residing within the channel; and
a drive unit affixed to the first end of the track and operatively coupled to the drive member for translating the trolley assembly along the path.

17. A vertical wall having the lift and storage system of claim 16 installed thereon.

18. A method of storing an article, the method comprising:
providing the storage system of claim/installed on the vertical wall and having the trolley assembly positioned adjacent the second end of the track;
securing the article to the trolley assembly; and
operating the drive unit so as to engage the drive member and translate the trolley assembly along the path toward the first end of the track.

19. The system of claim 16, wherein the trolley assembly comprises a collar extending substantially perpendicular to the trolley body and defining a substantially square channel.

\* \* \* \* \*